Dec. 19, 1944.  E. A. WALSTROM  2,365,501
BUILDER'S SAFETY PLATE BRACKET UNIT
Filed July 13, 1942
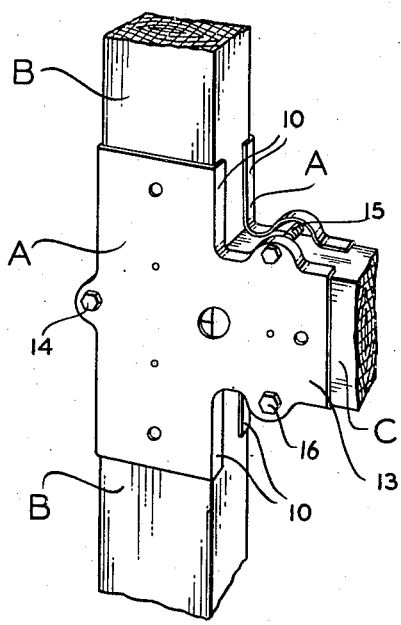
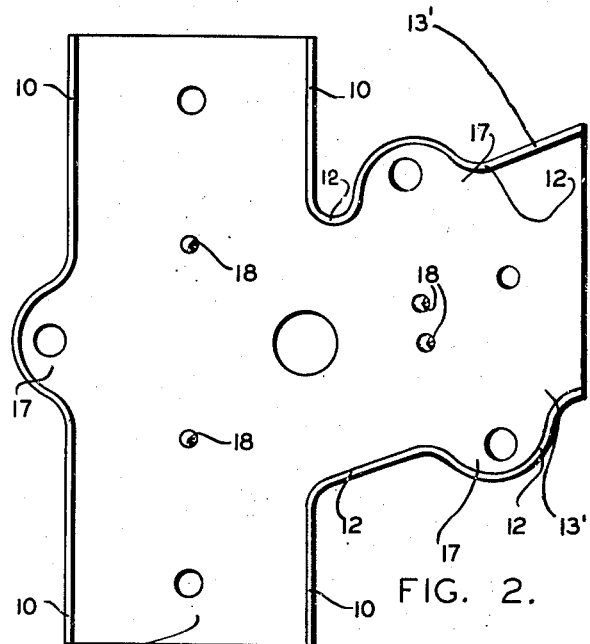
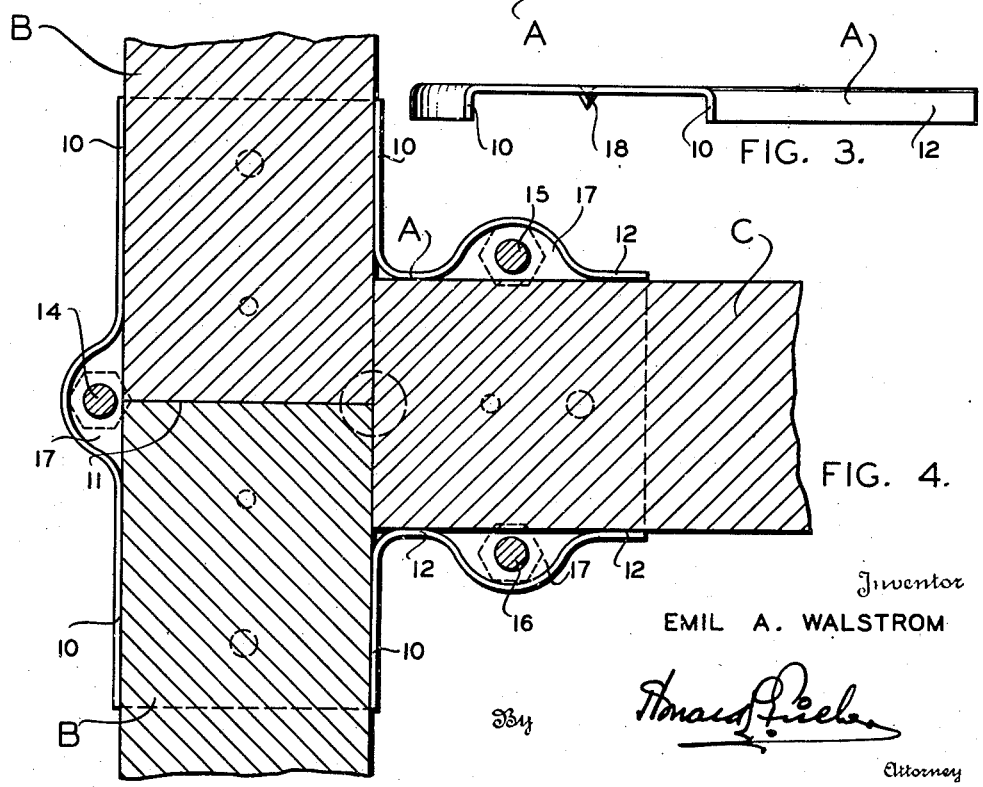
Inventor
EMIL A. WALSTROM Patented Dec. 19, 1944

2,365,501

UNITED STATES PATENT OFFICE 2,365,501

BUILDER'S SAFETY PLATE BRACKET UNIT

Emil A. Walstrom, St. Louis Park, Minn., assignor to Builders Safety Products, Inc., St. Louis Park, Minn., a corporation of Minnesota Application July 13, 1942, Serial No. 450,823

6 Claims. (Cl. 304—40)

My invention relates to a builder's safety plate bracket unit which includes a pair of sheet metal plates formed with right angular channels for timbers so that two or more timbers may be connected together extending right angularly to each other without forming holes in the timbers and without requiring nails to hold the timbers together.

A feature resides in forming out of sheet metal, a pair of plates which form a unit bracket for connecting wooden timbers together. The plates are formed from a single piece of material and may be virtually identical so that one plate fits on one side of the timber and the other plate on the other side, and by means of a series of bolts the plates are adjustably clamped over the timbers to rigidly and securely connect the timbers together without nailing or boring holes in the timbers.

A further feature of my safety plate bracket unit resides in the simple lightweight construction providing sectional bracket means which permits a scaffolding to be connected together on the job by standard timbers. The plates may be made to fit various size timbers and while I have illustrated a unitary bracket means for connecting the timbers together at right angles, it is obvious that the plates may be formed with angularly disposed channels for the timbers as illustrated in dotted outline in the drawing, and thus any angle connection may be provided for connecting timbers together.

A feature resides in the simple lightweight plate-like bracket unit for connecting timbers together.

In the drawing forming a part of this specification:

Figure 1 illustrates a perspective view of my builders' safety plate bracket unit connecting wooden timbers together.

Figure 2 is a side view looking at the inside of a modification of the plates.

Figure 3 is a plan edge view looking at the plate illustrated in Figure 2.

Figure 4 is a section through the timbers shown in Figure 1 to illustrate the manner in which several timbers may be clamped together in my unitary plate brackets.

The drawing illustrates the sheet metal plates A formed with peripheral flanges 10 extending parallel to each other which are adapted to form channels for the timbers B extending in one direction. In the drawing the timbers B butt together at 11 centrally between the plates A.

The plates A are formed with an auxiliary channel for the timber C by means of the parallel flanges 12 which are peripheral to the projecting portion 13 of the plates A. The channel formed by the flanges 12 may extend at right angles to the channels formed by the flanges 10 as illustrated in the drawing; however, if it is desired to extend the channel for the timber C angularly in relation to the timbers B, the plates A may be formed with an angularly disposed timber receiving end 13' illustrated in the modified form in Figure 2.

The plates A are adapted to be bolted together by the bolts 14, 15 and 16, and I provide projecting ears 17 which are formed integral with the plates A and around the edge of which the respective flanges 10 and 12 extend to reinforce the same. These projecting ear portions act to receive the bolts 14, 15 and 16 outside of the line of the timbers which are clamped between the plates A. Thus the timbers B and C may be connected together rigidly between the plates, with the bolts extending outside of the timbers and not requiring any holes to be made through the timbers.

The plates A are formed with spiking tits 18 projecting on the inner surface of the same which bite into the surface of the timbers B and C to assist in holding the timbers firmly between the plates when they are clamped together.

The plates are stamped from sheet metal with the flanges formed on the peripheral edges thereof and may be of comparatively lightweight metal, yet being strong enough so as to provide a rigid clamping means which is adapted to fit over the side edges of the timbers to clamp the timbers firmly in place. When the pair of plates A are connected together by the bolts 14, 15 and 16, they act as a unit clamping means for holding the timbers connected together in a firm, fixed manner so as to provide a firm, rigid joint.

I claim:

1. A unitary timber clamping plate means including a pair of sheet metal plates each formed from a single piece of metal, peripheral flanges extending parallel and adapted to receive the parallel edges of wooden timbers therebetween, bolt receiving ears reinforced by said peripheral flanges and projecting beyond the timber lines, and a series of bolts adapted to clamp said plates together over the sides of connecting timbers to securely fasten the same together.

2. A pair of sheet metal plates each having inturned peripheral flanges forming parallel channels when the plates are positioned, said channels adapted to receive a plurality of pieces of timber positioned end to end, bolt-receiving ears projecting from the sides of said plates having peripheral flanges for reinforcement, and bolts adapted to extend through pairs of said ears outside the limits of the timbers to clamp said timbers so as to produce in effect an integral union of the ends thereof.

3. A pair of sheet metal plates each having inturned peripheral flanges forming parallel channels when the plates are positioned, said channels adapted to receive a plurality of pieces of timber positioned end to end, bolt-receiving ears projecting from the sides of said plates with the peripheral flanges of said plates extending around said ears, bolt adapted to extend through pairs of said ears outside the limits of the timbers to clamp said timbers so as to produce in effect an integral union of the ends thereof, and pointed conical projections extending inwardly from said plates adapted to be forced into the outer portion of the walls of said timbers when the bolts are caused to clamp the plates upon the timbers.

4. A unitary sectional plate-like timber clamping means including a pair of sheet metal clamping plates, bolts adapted to rigidly connect said plates together upon end portions of a series of wooden timbers interposed between said plates, integral flanges formed on said plates adapted to fit over the parallel edges of the timbers, pointed conical projections on the plates adapted to penetrate the sides of the timbers, and bolt means for causing said penetration and connecting said plates together to lock the ends of said series of timbers therebetween.

5. Means for simultaneously clamping together end to end abutting timbers and a timber abutting the sides of said timber ends, comprising a pair of T-shaped plates each having continuous marginal flanges adapted to receive between them abutting timber ends, two of said ends being in line and the other end at an angle thereto, bolt-receiving ears projecting from certain sides of each of said plates inside of said flanges, and bolts adapted to extend through pairs of said ears outside the limits of the timbers to clamp said timbers so as to produce in effect an integral union of all the ends of all of them.

6. Means for simultaneously clamping together end-to-end abutting timbers and a timber abutting the sides of the timber ends, comprising a pair of T-shaped plates each having continuous marginal flanges adapted to receive between them abutting timber ends, two of said ends being in line and the other at an angle thereto, a bolt-receiving ear extending from the long side of each of said plates inside said flanges, a bolt-receiving ear extending from each of the short sides of the T stem of each of said plates inside said flanges, and bolts adapted to extend through a facing pair of said ears outside the limits of the timbers to clamp said timbers so as to produce in effect an integral union of all the ends thereof.

EMIL A. WALSTROM.